US011047093B2

(12) United States Patent
Pauchet et al.

(10) Patent No.: US 11,047,093 B2
(45) Date of Patent: Jun. 29, 2021

(54) SEALING DEVICE FOR A RAILWAY

(71) Applicant: ALSTOM Transport Technologies, Saint-Ouen (FR)

(72) Inventors: Frederic Pauchet, Asnieres sur Seine (FR); David Medina-Pineda, Asnieres sur Seine (FR); Jean-Yves Dubouchet, Maing (FR); Samir Osmani, Dunkirk (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 323 days.

(21) Appl. No.: 16/158,919

(22) Filed: Oct. 12, 2018

(65) Prior Publication Data

US 2019/0136461 A1 May 9, 2019

(30) Foreign Application Priority Data

Oct. 13, 2017 (FR) ...................................... 1759610

(51) Int. Cl.
*E01B 21/02* (2006.01)
*E01B 19/00* (2006.01)
*E01B 21/00* (2006.01)
*F16J 15/02* (2006.01)

(52) U.S. Cl.
CPC .............. *E01B 21/02* (2013.01); *E01B 19/00* (2013.01); *E01B 21/00* (2013.01); *F16J 15/021* (2013.01)

(58) Field of Classification Search
CPC ........... E01B 21/00; E01B 21/02; E01B 21/04
See application file for complete search history.

(56) References Cited

U.S. PATENT DOCUMENTS

| 6,764,021 | B1 * | 7/2004 | Birt | ........................... E01C 9/04 238/2 |
| 8,172,158 | B1 * | 5/2012 | Burkhardt | ................. E01C 9/04 238/8 |
| 2012/0000988 | A1 * | 1/2012 | Burkhardt | ............... E01B 21/00 238/9 |

FOREIGN PATENT DOCUMENTS

| DE | 8424521 U1 | 11/1984 | |
| DE | 102013011451 A1 | 1/2015 | |
| EP | 1813723 A1 * | 8/2007 | .......... E01B 19/003 |
| EP | 2088240 A2 * | 8/2009 | ............ E01B 21/00 |
| EP | 2088240 A2 | 8/2009 | |
| FR | 2869628 A1 | 11/2005 | |
| FR | 2947285 A1 | 12/2010 | |
| FR | 3051200 A1 | 11/2017 | |

OTHER PUBLICATIONS

Search Report for FR Application 1759610 dated Jun. 7, 2018.

\* cited by examiner

*Primary Examiner* — Robert J McCarry, Jr.

(74) *Attorney, Agent, or Firm* — Thompson Coburn LLP; Steven M. Ritchey

(57) ABSTRACT

This sealing device for a railway, the railway including a housing extending between a side face of a rail and a side wall of a slot reserved in the ground for housing said rail, is characterized in that it is a sealing device inserted in the housing and fixed in the housing by a suitable putty, and in that it is a resiliently deformable profile, to be able to be inserted under stress in the housing and to be pressed against the side face of the rail and the side wall of the slot.

28 Claims, 6 Drawing Sheets

SEALING DEVICE FOR A RAILWAY

CROSS-REFERENCE TO RELATED APPLICATIONS

The present application is a non-provisional application claiming the benefit of FR 17 59610, filed Oct. 13, 2017, which is incorporated herein by reference in its entirety.

FIELD OF THE INVENTION

The present invention relates to sealing devices between a rail and the wall of a slot provided in the roadway to receive the head of said rail.

BACKGROUND OF THE INVENTION

As illustrated in FIG. 1, in the case for instance of a railway for the circulation of trams, the rail 2 is installed so as to be flush with the surface of the ground 1. The rail 2 is fixed, by a suitable staple system 4, on a buried tie 3 (or a slab), preferably made from concrete. The installation trench for the railway is backfilled to reconstitute the ground 1, the surface layer of the ground for example being made up of pavement.

In the case of a so-called embedded railway, the ground 1 is reconstituted so as to arrange a slot 5, inside which the rail 2 is located, the slot delimiting a chamber on either side of the rail 2. A suitable material, such as an elastomer, for example a low-density polyethylene, is poured into the chamber to encapsulate the rail 2.

In the case of a more traditional railway, a rail is provided on the worksite whereof the base is already encapsulated in an elastomer fishing surface. Once this assembly is fixed on the tie 3, the ground is reconstituted.

This encapsulation 6 of the rail 2 serves to electrically insulate the rail from the ground to prevent stray currents. It also serves to absorb the mechanical vibrations when trams pass.

This encapsulation 6 has an upper surface withdrawn from the surface of the ground 1, such that two housings 7 and 8 are arranged on either side of the upper part of the rail 2, also called head or rail head.

To prevent rainwater from infiltrating the chamber 5, sealing devices 9 and 10 are poured, in situ, in each of the two housings 7 and 8.

Currently, to produce the sealing devices 9 and 10, it is provided to prepare each housing 7 and 8, in particular by applying a first adhesion on the rail 2. Then, a second elastomer material, typically polyurethane (for example dual component), or asphalt, is poured into each housing 7 and 8 over a thickness making it possible to make up the level of the surface of the ground 1. The material fills the housing 7 or 8 and adheres to the side face of the rail 2, the upper surface of the encapsulation 6, and the side wall of the slot 5.

However, producing such a sealing device requires heavy equipment.

Furthermore, complex operations, consisting of mixing chemical products in specific quantities to prepare the second material such that it has suitable properties to be able to be poured, then to harden in an acceptable amount of time, take place on the worksite. These hemical products are toxic for operator health. Any error in the mixed quantities or the environmental conditions for producing the sealing device (in particular in terms of temperature or the absence of rain) results in obtaining a sealing device of mediocre quality, in particular having a shortened lifespan.

If a sealing flaw in a sealing device length is not detected over time, rainwater may infiltrate and corrode the rail or its fastening system on the tie or alter the ground supporting the infrastructure, eventually raising safety and reliability problems. The infiltrating water also degrades the polymer material of the encapsulation, which is sensitive to the action of the water.

Lastly, if the sealing device is completely removed locally, the mechanical action of the pneumatics of the vehicles sharing the roadway with the tram quickly degrades the encapsulation of the rail.

The maintenance operations of a degraded length of the sealing device consist of completely replacing said sealing device length. The costs of dropping off and placing a new sealing device length are substantial.

Lastly, it has been noted that such a sealing device, even if placed correctly, has a much shorter lifespan than that initially expected. For a railway intended to remain in service for at least 30 years, significant degradations appear after 5 years, and the sealing device must be replaced after no more than 10 years.

BRIEF SUMMARY OF THE INVENTION

The aim of the present invention is therefore to resolve these problems.

To that end, the invention relates to a sealing device for a railway, the railway including a housing extending between a side face of a rail and a side wall of a slot reserved in the ground for housing said rail, characterized in that said sealing device is a sealing device inserted in the housing and fixed in the housing by a suitable putty, and in that the sealing device is a resiliently deformable profile, to be able to be inserted under stress in the housing and to be pressed against the side face of the rail and the side wall of the slot.

According to specific embodiments, the sealing device includes one or more of the following features, considered alone or according to any technically possible combinations:
- the sealing device has a cross-section including at least one "V" pattern, the "V" pattern being deformable resiliently to modify a width of said sealing device.
- the "V" pattern is made up of a first wall with an angle and a second wall with an angle, connected to one another with a rim, a thickness of the rim being refined relative to a thickness of the first and second walls so as to allow a resilient deformation of the "V" pattern by modifying an angle between the first and second walls.
- the cross-section is symmetrical along a median axis.
- the sealing device includes a right wing and a left wing, each wing including a "V" pattern.
- the sealing device includes a central core on either side of which the right and left wings are connected, the central core bearing on a bottom of the housing.
- the sealing device includes an upper portion connected to an upper face of the central core and extending transversely so as to cover the or each "V" pattern.
- the sealing device has a cross-section including at least one lip on a side end, the or each lip being resiliently deformable to modify a width of said sealing device.
- the cross-section is symmetrical along a median axis.
- the or each lip is inclined relative to the median axis of the sealing device so as to be able to be moved upward during the forcible insertion of the sealing device into the corresponding housing.

the sealing device includes a central core on either side of which right and left wings are connected, the central core bearing on a bottom of the housing and each wing bearing, on the side of a side end of the sealing device, a pair of lips.

the sealing device includes side ends having an arc of circle-shaped contour.

the sealing device is made from a polymer material, preferably a synthetic rubber.

The invention also relates to a railway, including: a housing extending between a side face of a rail and a side wall of a slot reserved in the ground to house said rail; and a sealing device in said housing, characterized in that the sealing device is according to the preceding sealing device, and is inserted in the housing and fixed in the housing by a suitable putty.

BRIEF DESCRIPTION OF THE DRAWINGS

The invention and its advantages will be better understood upon reading the following detailed description of one particular embodiment, provided solely as a non-limiting example, this description being done in reference to the appended drawings, in which.

DETAILED DESCRIPTION OF THE INVENTION

Figure 2:
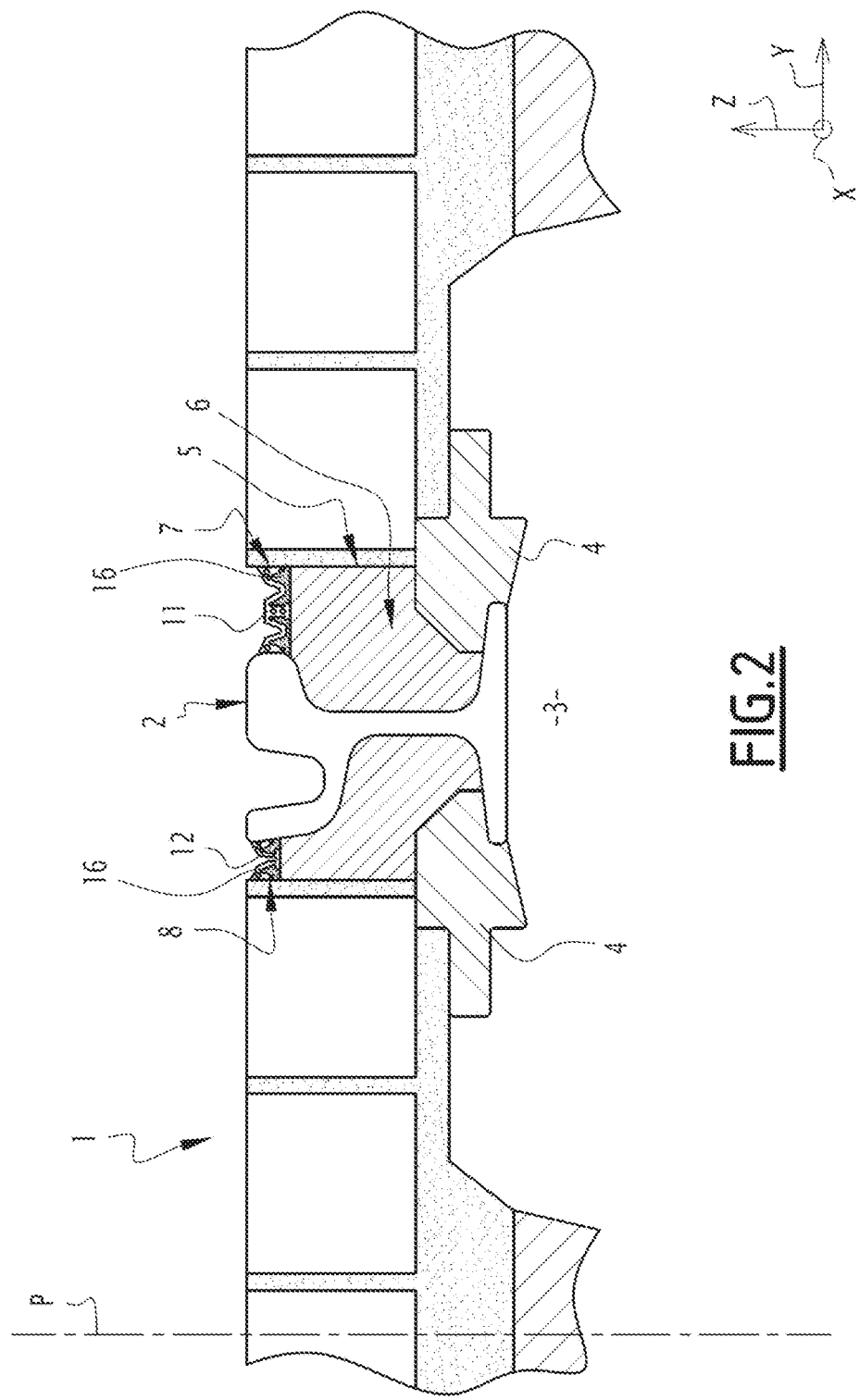
FIG. 2 is a sectional view similar to that of FIG. 1, but in which two sealing devices according to a first embodiment of the invention are implemented.

FIG. 2 shows half of a railway, the latter being symmetrical relative to the median plane P. The railway implements one or several sealing devices according to the invention.

Figure 1:
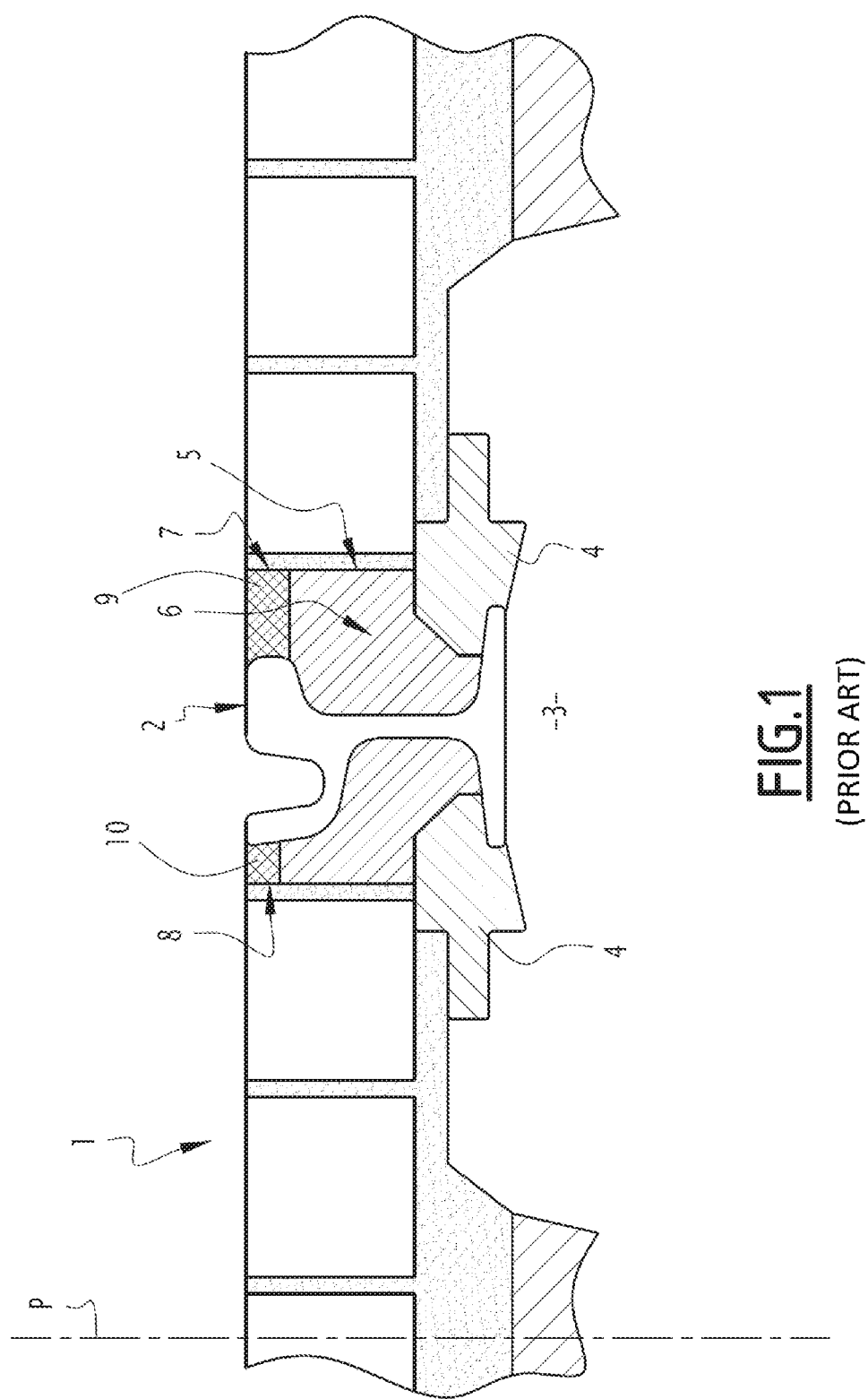
FIG. 1 is a sectional view of a railway integrated into the ground, in line with one of the rail lines, according to the state of the art.

FIG. 2 is thus identical to FIG. 1 with the exception of the fact that the two sealing devices 9 and 10 poured according to the state of the art are replaced here by two sealing devices 11 and 12 inserted and fixed by gluing using a suitable putty 16, in each of the housings 7 and 8, on either side of the portion of the head of the rail 2 emerging from the encapsulation 6.

Each sealing device 11, 12 is resiliently transversely deformable, to be able to be lowered under stress into the corresponding housing, then, after having been released, to be pressed against the side face of the rail 2 and the side wall of the slot 5.

In the embodiment shown in FIG. 2, the rail 2 being asymmetrical, the first housing 7, located on the outer side of the railway, has a first width of about 50 mm, while a second housing 8, located on the inner side of the railway, has a second width of about 20 mm.

Figure 3:
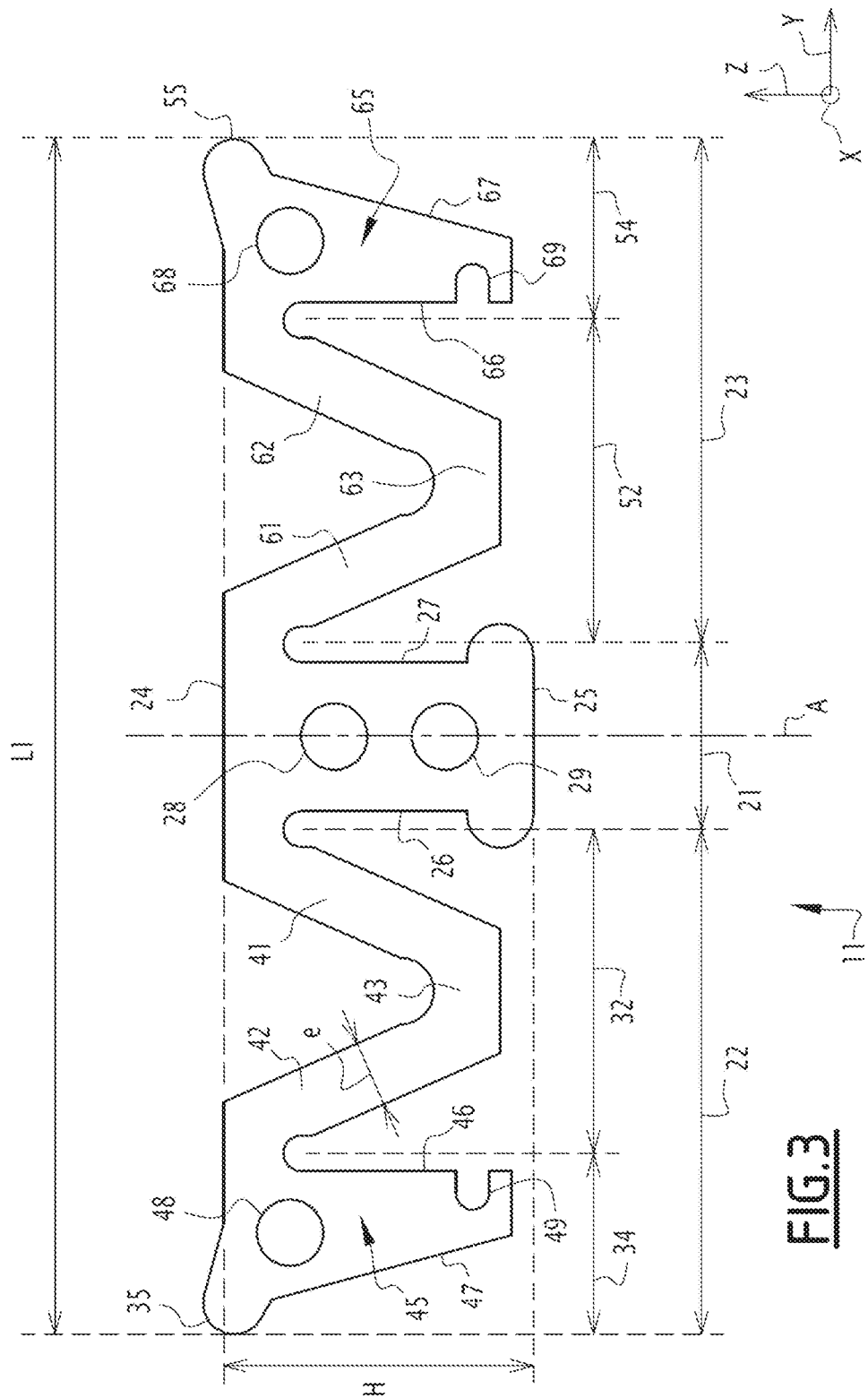
FIG. 3 is a sectional view of a first alternative of a sealing device according to the first embodiment.
Figure 4:
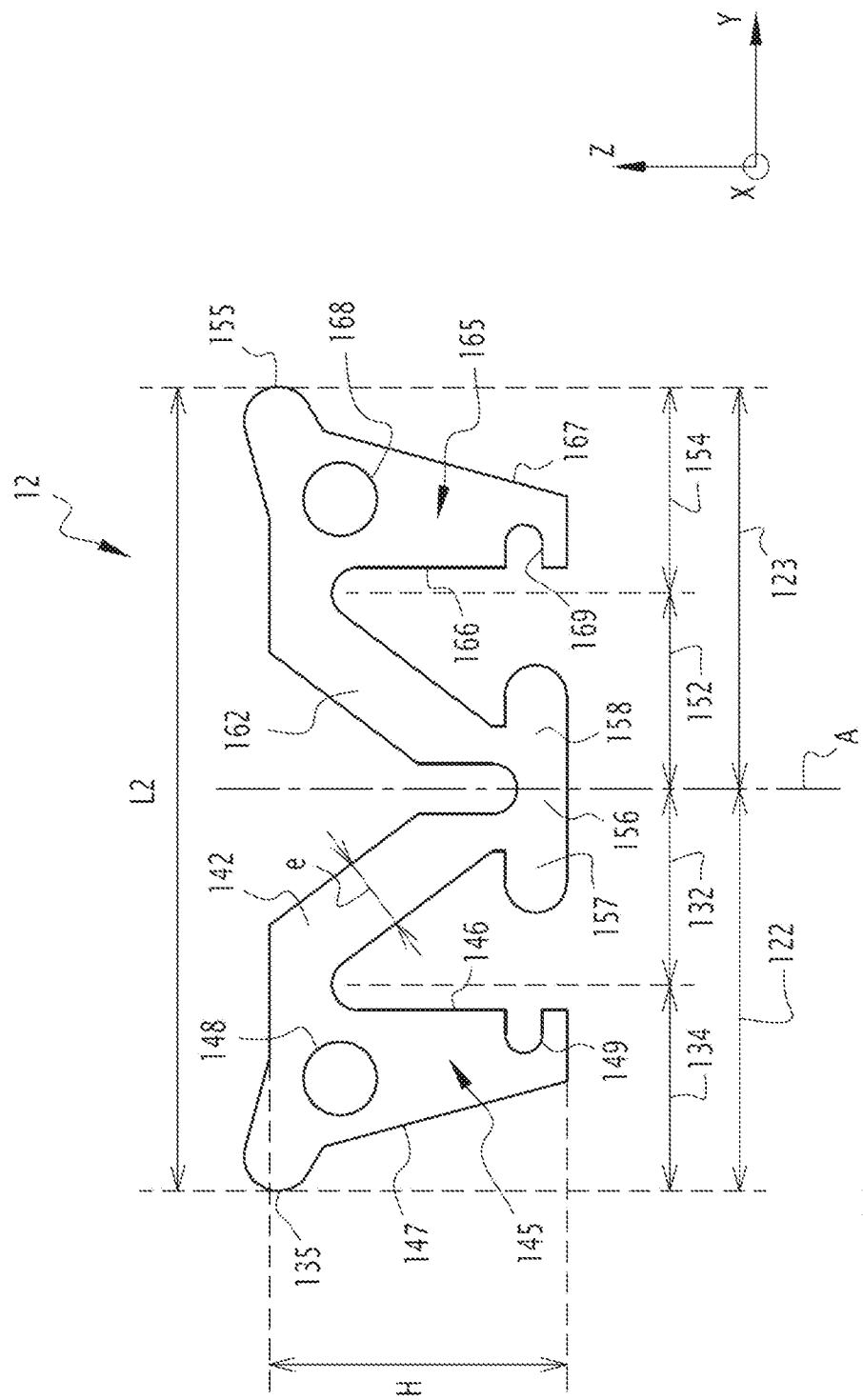
FIG. 4 is a sectional view of a second alternative of a sealing device according to the first embodiment.

Thus placed in the first housing 7 is a first sealing device 11, corresponding to a first alternative of a first embodiment of the sealing device according to the invention and shown in more detail in FIG. 3; and in the second housing 8, a second sealing device 12, corresponding to a second alternative of the first embodiment of the sealing device according to the invention and shown in more detail in FIG. 4.

In reference now to FIG. 3, the sealing device 11 is made from a polymer having a certain rigidity. For example, a synthetic rubber is used.

The sealing device 11 is a profile along a longitudinal direction X.

The cross-section of said profile, i.e., the section of the sealing device 11 in a plane YZ perpendicular to the longitudinal direction X, is shown in FIG. 3.

When the sealing device 11 equips the railway, the axis X is intended to coincide with the longitudinal axis of the rail 2, the axis Z with the normal to the surface of the ground 1, and the axis Y with a transverse direction of the railway.

The cross-section is fitted in a rectangle with width L1 and height H. It is symmetrical relative to a median longitudinal plane A, parallel to the plane ZX.

The sealing device 11 includes a central core 21 and left 22 and right 23 side wings, on either side of the central core 21.

The central core 21 has an upper face 24 and a lower face 25, as well as a left side face 26 and a right side face 27. The faces of the central core 21 are substantially planar.

The upper face 24 is smooth or slotted.

The bases of the side faces 26 and 27 are bowed so as to form anchors to favor the adhesion of the sealing device 11 to the fastening putty used to adhere the sealing device 11 in the housing 7.

The height of the central core 21 determines the height H of the sealing device. The lower surface 25 is able to bear on the surface of the encapsulation 6 forming the bottom of the housing 7. The other portions of the sealing device are withdrawn along the direction Z relative to the lower surface 25.

Advantageously, the central core 21 includes longitudinal recesses 28 and 29 to save component material of the sealing device 11 and keep the local thickness of the sealing device 11 below a threshold value, in order to limit the shrinkage effects of the material and therefore deformation of the sealing device 11 during manufacturing thereof. Using a tenon-mortise system, they make it possible to join two successive sealing device lengths.

The left wing 22 includes an intermediate portion 32 connected to the central core 21 and an end portion 34, connected to the intermediate portion 32.

The intermediate portion 32 has an accordion shape including at least one "V" or fold pattern. In the embodiment shown in FIG. 3, the intermediate portion 32 includes a single "V" pattern made up of a first angled wall 41 and a second angled wall 42, connected to one another by a rim 43.

The end of the first wall 41 opposite the rim 43 is connected to the upper edge of the left side face 26 of the central core 21.

The end of the second wall 42, opposite the rim 43, is connected to the end portion 34.

The thickness of the rim 43, and preferably that of the first wall 41 where it is connected to the central core 21 and that of the second wall 42 where it is connected to the end wall 34, is smaller relative to the thickness e of the first and second walls 41 and 42.

Refining the ends of the walls 41 and 42 allows a resilient deformation of the intermediate portion 32. This "accordion" effect allows a resilient modification of the width of the sealing device 11, by altering the angle between the first and second walls 41 and 42.

The height of the intermediate portion 32, i.e., of the "V" pattern, is, in the nondeformed state of the sealing device 11, smaller than the height H, such that, in the maximally deformed state of the sealing device 11, the first and second walls then being practically against one another, the height of the intermediate portion 32 is equal to or remains smaller than the height H, which is adapted to the height of the housing having to receive the sealing device.

The concave side of the "V" patterns, oriented upward, can be radiated to facilitate cleaning and the flow of rainwater toward a lateral discharge conduit.

The end portion 34 includes a fallen wall 45 having an inner side face 46, oriented toward the central core 21, and an outer side face 47, oriented away from the core 21.

The upper edge of the inner side wall 46 is connected to the second wall 42 of the intermediate portion 32.

The side end 35 of the sealing device 11 corresponds to the upper edge of the outer side wall 47, which is bowed so as to protrude laterally relative to the outer side face 47.

Advantageously, the side end 35 has, in the transverse plane YZ, an arc of circle-shaped contour. Thus, the contact between the sealing device 11 and the rail 2 or the wall of the slot 5 is a substantially periodic contact, but movable along said contour based on the local deformation state of the sealing device 11. The sealing device—rail or sealing device—wall contact of the slot is therefore of good quality able to provide the sealing and sustainability of the sealing device.

The fallen wall 45 advantageously includes a longitudinal recess 48 two save the component material of the sealing device 11 and keep the local thickness of the sealing device 11 below a threshold value, in order to limit the shrinkage effects of the material and therefore deformation of the sealing device during manufacturing thereof. It also makes it possible to connect two successive lengths of the sealing device.

Advantageously, the fallen wall 45 includes, for example on the inner side face 46, a groove 49 making it possible to form a reserve of putty for better fastening of the sealing device.

A similar description could be done for the right wing 23 of the sealing device 11, which includes an intermediate portion 52, made up of a first angled wall 61, a second angled wall 62, connected to one another by a rim 63 to form a "V" pattern; and an end portion 54, the fallen wall 65 of which includes an inner wall 66, an outer wall 67 and a longitudinal recess 68. The lower edge of the inner wall 66 is provided with a groove 69. The upper edge of the outer wall 67 is bowed such that the sealing device has a side end 55 protruding laterally relative to the wall 67. The side end 55 advantageously has an arc of circle-shaped contour.

In FIG. 4, the second sealing device 12 has a reduced width L2 relative to that L1 of the first sealing device 11 in order to be received in the second housing 8.

Simply put, the cross-section of the second sealing device 12 can be seen as corresponding to that of the first sealing device 11 from which the central core 21 and the first walls 41 and 61 of the right 22 and left 23 wings have been removed, so as to connect the second walls 42 and 62 of the right 22 and left 23 wings directly along a median rim.

More specifically, in reference to FIG. 4, the second sealing device 12 thus has a symmetrical cross-section relative to a median longitudinal plane A, parallel to the plane ZX.

The sealing device 12 includes left 122 and right 123 wings on either side of the median plane A.

The left wing 122 includes an intermediate portion 132 connected directly to the right wing 123 and an end portion 134, connected to the intermediate portion 132.

The intermediate portion 152 includes a first angled wall 142.

The right wing 123 includes an intermediate portion 152 connected directly to the left wing 122 and an end portion 154, connected to the intermediate portion 152.

The intermediate portion 132 includes a second angled wall 162.

The first wall 142 is connected to the second wall 162 along a rim 156.

The end of the wall 142 opposite the rim 156 is connected to the end portion 134 and the end of the wall 162 opposite the rim 156 is connected to the end portion 154.

Advantageously, the thickness of the rim 156, and preferably that of the wall 142 where it is connected to the end portion 134, and that of the wall 162 where it is connected to the end wall 154, is smaller in particular relative to the thickness e of the walls 142 and 162 to allow the resilient deformation along the transverse direction of sealing device.

Indeed, locally refining the thickness of the ends of the walls 142 and 162 makes it possible to obtain a resilient deformation of the "V" pattern formed by said two walls. This "accordion" effect makes it possible to change the width L2 of the sealing device 12.

The rim 156 is advantageously transversely bowed to have lateral protrusions 157 and 158 able to anchor the sealing device 12 in the fastening putty. It advantageously makes it possible to increase the contact surface between the sealing device and the encapsulation 6.

The end portion 134 includes a fallen wall 145 having an inner face 146 and an outer face 147.

The upper edge of the inner face 146 is connected to the wall 142.

The side end 135 of the sealing device 12 corresponds to the upper edge of the outer face 147, which is bowed so as to protrude laterally past the outer face 147.

The fallen wall 145 advantageously includes a longitudinal recess 148.

The inner face 146 of the fallen wall 145 advantageously includes an anchoring groove 149.

In this alternative, the fallen wall 145 descends substantially to the same horizontal level as the lower face of the central core so as to offer additional bearing for the sealing device on the encapsulation 6.

Symmetrically, the end portion 154 includes a fallen wall 165 having an inner face 166 and an outer face 167.

The upper edge of the inner face 166 is connected to the wall 162.

The side end 155 of the sealing device 12 corresponds to the upper edge of the outer face 167, which is bowed so as to protrude laterally relative to the outer face 167.

The fallen wall 165 advantageously includes a longitudinal recess 168.

The inner face 166 of the fallen wall 165 advantageously includes a groove 169.

Figure 5:
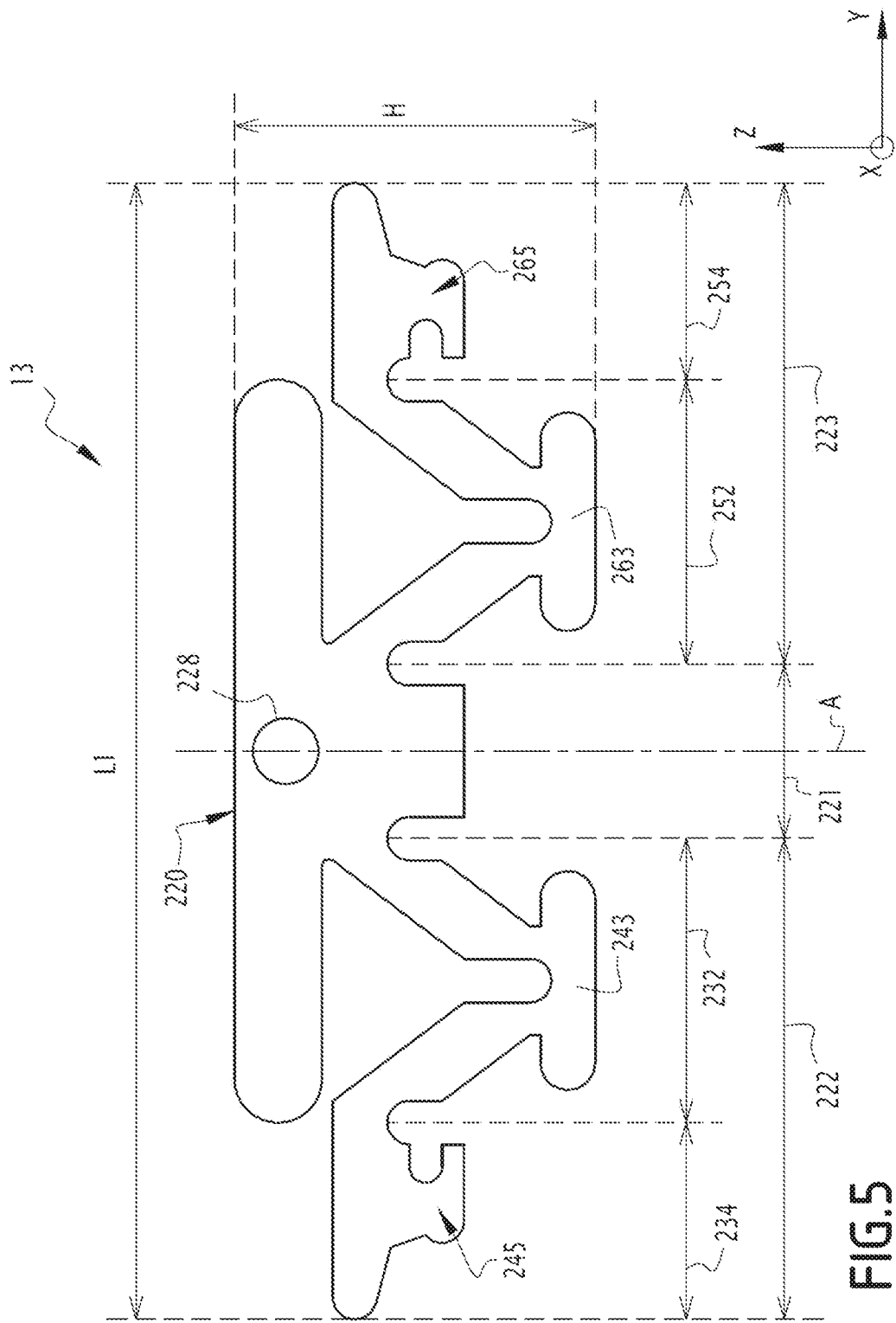
FIG. 5 is illustrates other alternative embodiments of the sealing device according to the first embodiment.

Many alternatives of the first embodiment of the sealing device can be considered, some of which are shown on the sealing device 13 of FIG. 5.

In a first alternative, the central core 221 has a reduced height relative to that of the sealing device 11 of FIG. 3. It is the rims 243 and 263 of the intermediate portions 232 and 252 of the right 222 and left 223 wings that are transversely bowed so as to have protrusions and a wider lower face in order to cooperate effectively with the fastening putty and the surface of the encapsulation 6.

The fallen walls 245 and 265 of the end portions 234 and 254 of the right 222 and left 254 wings may then have a reduced height relative to that of the sealing device 11.

In this alternative embodiment, there is no location where the thickness of the material exceeds the threshold thickness. It is therefore no longer necessary to provide recesses in the end portions.

In a second alternative, independent of the previous one, the sealing device 13 includes an upper portion 220 connected to the upper face of the core 221 and extending transversely so as to form a wall covering the "V" patterns of the intermediate portions 232 and 252. In this way, the concave side of the "V" patterns, open upward, is closed here, but without limiting the transverse deformation of the sealing device. The upper portion has a transverse extension corresponding at most to the minimum width of the sealing device 13, or to its width in the maximum deformation state.

The upper surface of the sealing device is thus flatter, facilitating contact with the tires of the vehicles rolling on the railway.

A longitudinal recess 228 must optionally be provided in the central core 221.

Figure 6:
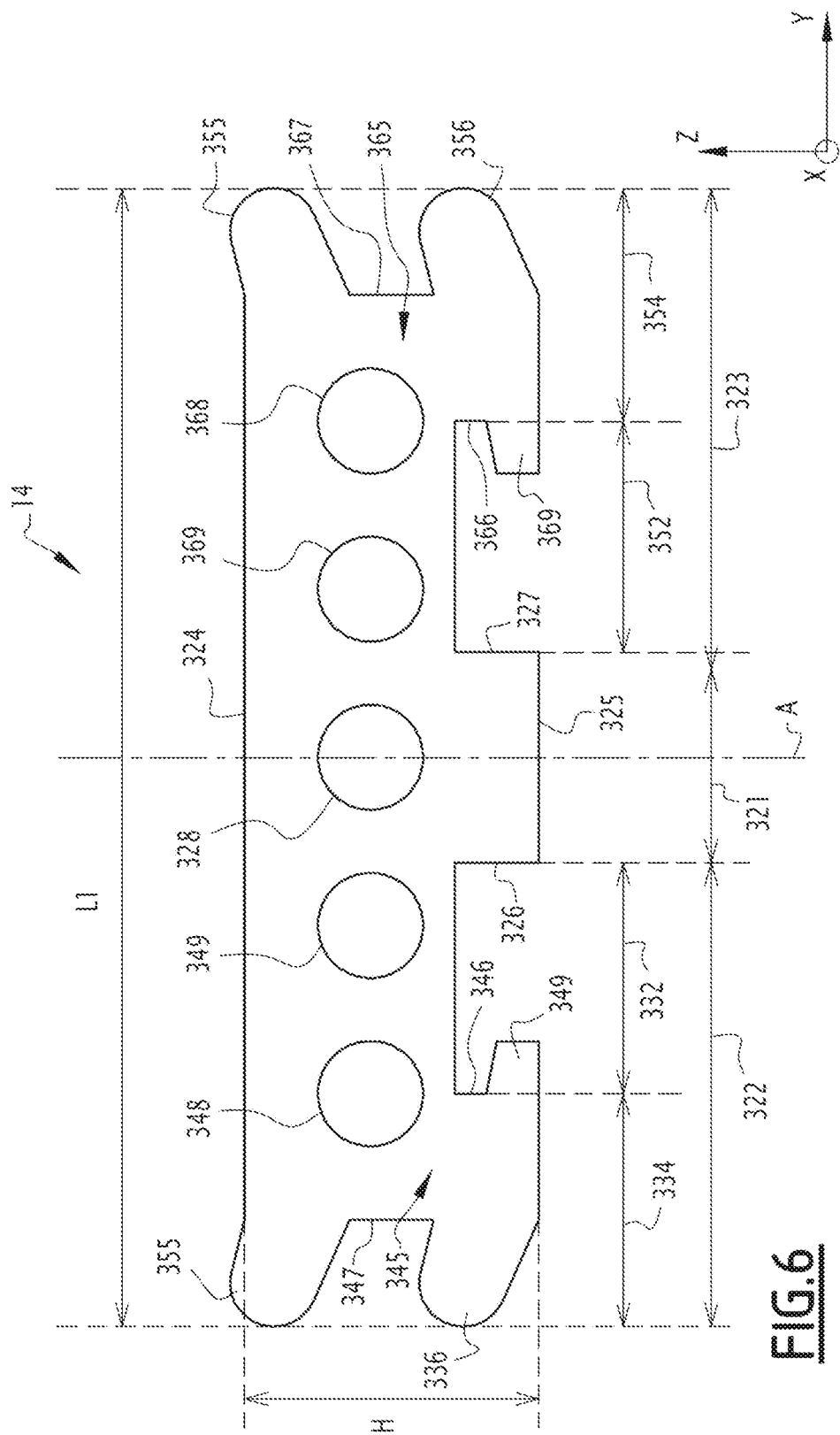
FIG. 6 is a sectional view of a second alternative of a sealing device according to the invention.

A second embodiment of the sealing device according to the invention will now be described. This is a profile whose section is shown in FIG. 6.

The section of the sealing device 14 is fitted in a rectangle with width L1 and height H. It is therefore intended to be received in the housing 7. A sealing device suitable for the housing 8 can easily be deduced from the presentation of the sealing device 14.

The sealing device 14 is symmetrical relative to a median axis A. It includes a central portion 321 and left 322 and right 323 side wings on either side of the central portion.

The central portion has lower 325 and upper 324 faces and left 326 and right 327 side faces. It includes a central orifice 328.

The left wing 322 includes an intermediate portion 332 connected to the central portion 321 and an end portion 334, connected to the intermediate portion 332.

The intermediate portion 332 here is substantially rectangular. It has a central orifice 349.

The end portion 334 includes a fallen wall 345, an inner side face 346 of which bears, on the side of its lower edge, a protrusion 349 for anchoring in the adhesion putty, and an outer side face 347 of which includes, on the side of its upper edge, an upper lip 335 and, on the side of its lower edge, a lower lip 336. The lips 335 and 336 form the left side end of the sealing device 14. The end portion 334 also includes an orifice 348.

Symmetrically, the right wing 323 includes an intermediate portion 352 connected to the central portion 321 and an end portion 354, connected to the intermediate portion 352.

The intermediate portion 352 is rectangular. It has a central orifice 369.

The end portion 354 includes a fallen wall 365, an inner side face 366 of which bears, on the side of its lower edge, a protrusion 369 for anchoring in the adhesion putty, and an outer side face 367 of which includes, on the side of its upper edge, an upper lip 355 and, on the side of its lower edge, a lower lip 356. The lips 355 and 356 form the right side end of the sealing device 14. The end portion 354 also includes an orifice 368.

In this second embodiment, the deformation of the sealing device to adapt the width thereof is obtained essentially at the lips 335, 336, 355 and 356 of the right and left ends of the sealing device, by deformation along the direction of the height of the sealing device. The sealing device according to the second embodiment is instead adapted to be inserted forcibly into its receiving housing.

Advantageously, the lips are inclined so as to form an angle with the axis A that is slightly smaller than a right angle, to facilitate their upward deformation when the sealing device is lowered into its receiving housing and the free end of each lip rubs against the wall of the rail or that of the slot.

Advantageously, each lip has an arc of circle-shaped contour in the plane transverse to the longitudinal direction of the sealing device.

The method for installing a sealing device according to the invention will now be described in detail, more particularly in reference to the first sealing device 11 of FIG. 2.

The first sealing device 11 is produced in a factory, for example using an extrusion machine to give it the desired profile.

It is for example produced with an idle width L1 of 55 mm and an idle height H of 18 mm. It is produced by length, for example of 50 m.

The first sealing device 11 is wound around itself to form a spool, supplied on the worksite for producing the railway.

In parallel, the fastening putty is also supplied on the worksite. This for example is the putty sold by the company BOSTIK under the tradename "Simson MSR DC" and which is a putty belonging to the family of "silane-modified polymers" (or "Silyl-modified polymers"), i.e., hybrid polymers with a silicon-containing end.

Once the state of advance of the production of the railway is such that the placement of the sealing device is considered, putty is spread in the first housing 7, in particular in the bottom of the housing, i.e., on the upper surface of the encapsulation 6, and on the edges of the housing, i.e., on the side face of the rail head 2 and on the side wall of the slot 5.

A length of the housing 7 corresponding to the length of the first sealing device 11 to be installed is thus prepared.

Then, while being unwound, the sealing device 11 is inserted into the first housing 7. The sealing device is slightly transversely pinched by the operator, for example using a suitable tool, to be able to decrease the width thereof and lower it into the first housing 7.

The central core of the sealing device is pressed against the bottom of the housing to bear against the latter and laterally drive the excess putty below the wings of the sealing device 11.

The sealing device is next released by the operator so that, by transverse expansion, owing to the resiliency of the accordion portions, the sealing device 11 bears on the one hand against the rail 2 and on the other hand against the wall of the slot 5.

The width L1 of the first sealing device being chosen to be slightly larger than the width of the housing 7, the sealing device 11 is pressed against the edges of the housing 7 under the effect of the resilient expansion force caused by the residual transverse deformation of the sealing device.

Alternatively, the sealing device is inserted forcibly into the housing. This alternative embodiment is more particularly suitable for the second embodiment of FIG. 6.

It next suffices to wait a few hours for the putty to dry such that the sealing device is permanently glued.

It should be noted that the sealing device according to the invention, which is resiliently deformable, advantageously makes it possible to absorb the dimensional variations of the housing in which it is inserted, initial dimensional variations during the production of the railway, or dimensional variations during the exploitation of the railway (static variations, for example due to the compacting of the railway, or dynamic variations, for example due to the passage of trams).

This resiliency of the sealing device in particular makes it possible to accept a substantial width amplitude of the housing over the entire length of the sealing device.

Furthermore, this resiliency of the sealing device allows easy placement on curved passages of the railway, while guaranteeing good sealing between the rail and the receiving slot of the rail.

The height H of the sealing device 11 is chosen to be equal to or slightly smaller than the depth of the first housing 7 to absorb the deviations in the dimensions of the upper surface of the encapsulation 6 and the thickness of putty deposited in the housing, such that the sealing device 11 is completely received inside the housing 7 without exceeding the level of the ground 1.

This method is iterated for the placement of the second sealing device 12 in the second housing 8.

One skilled in the art will note that the sealing device according to the invention is particularly easy to place, the obtained sealing is of good quality, and makes it possible to protect the rail and its encapsulation effectively and in a prolonged manner over time.

What is claimed is:

1. A sealing device for a railway, the railway including a housing extending between a side face of a rail and a side wall of a slot reserved in the ground for housing the rail, wherein the sealing device is configured to be inserted in the housing and fixed in the housing by a fastening putty, and wherein the sealing device has a resiliently deformable profile, which is configured to be under stress upon being inserted in the housing so as to press against the side face of the rail and the side wall of the slot.

2. The sealing device according to claim 1, having a cross-section including a "V" pattern, the "V" pattern being deformable resiliently to modify a width of the sealing device.

3. The sealing device according to claim 2, wherein the "V" pattern is made up of a first angled wall and a second angled wall, which are connected to one another with a rim a thickness of the rim being refined relative to a thickness of the first and second angled walls so as to allow a resilient deformation of the "V" pattern by modifying an angle between the first and second angled walls.

4. The sealing device according to claim 2, wherein the cross-section is symmetrical along a median axis.

5. The sealing device according to claim 4, including a right wing and a left wing, each wing including a "V" pattern.

6. The sealing device according to claim 5, including a central core on either side of which the right and left wings are connected, the central core being configured to bear on a bottom of the housing.

7. The sealing device according to claim 6, including an upper portion connected to an upper face of the central core and extending transversely so as to cover the "V" pattern of each wing of the sealing device.

8. The sealing device according to claim 1, having a cross-section including at least one lip on a side end, the at least one lip being resiliently deformable to modify a width of the sealing device.

9. The sealing device according to claim 8, wherein the cross-section is symmetrical along a median axis.

10. The sealing device according to claim 9, wherein the at least one lip is inclined relative to the median axis of the sealing device so as to move upward during insertion of the sealing device into the housing.

11. The sealing device according to claim 8, including a central core on either side of which right and left wings are connected, the central core configured to bear on a bottom of the housing and each wing being provided, on the side of a side end of the sealing device, with a pair of lips.

12. The sealing device according to claim 1, including side ends having an arc of circle-shaped contour.

13. The sealing device according to claim 1, made from a polymer material.

14. The sealing device according to claim 13, wherein the polymer material is a synthetic rubber.

15. A railway comprising:
a housing extending between a side face of a rail and a side wall of a slot reserved in the ground to house the rail; and
the sealing device of claim 1 fixed in the housing by a fastening putty.

16. A railway comprising:
a housing extending between a side face of a rail and a side wall of a slot reserved in the ground to house the rail; and
the sealing device of claim 2 fixed in the housing by a fastening putty.

17. A railway comprising:
a housing extending between a side face of a rail and a side wall of a slot reserved in the ground to house the rail; and
the sealing device of claim 3 fixed in the housing by a fastening putty.

18. A railway comprising:
a housing extending between a side face of a rail and a side wall of a slot reserved in the ground to house the rail; and
the sealing device of claim 4 fixed in the housing by a fastening putty.

19. A railway comprising:
a housing extending between a side face of a rail and a side wall of a slot reserved in the ground to house the rail; and
the sealing device of claim 5 fixed in the housing by a fastening putty.

20. A railway comprising:
a housing extending between a side face of a rail and a side wall of a slot reserved in the ground to house the rail; and
the sealing device of claim 6 fixed in the housing by a fastening putty.

21. A railway comprising:
a housing extending between a side face of a rail and a side wall of a slot reserved in the ground to house the rail; and
the sealing device of claim 7 fixed in the housing by a fastening putty.

22. A railway comprising:
a housing extending between a side face of a rail and a side wall of a slot reserved in the ground to house the rail; and
the sealing device of claim 8 fixed in the housing by a fastening putty.

23. A railway comprising:
a housing extending between a side face of a rail and a side wall of a slot reserved in the ground to house the rail; and
the sealing device of claim 9 fixed in the housing by a fastening putty.

24. A railway comprising:
a housing extending between a side face of a rail and a side wall of a slot reserved in the ground to house the rail; and
the sealing device of claim 10 fixed in the housing by a fastening putty.

25. A railway comprising:
a housing extending between a side face of a rail and a side wall of a slot reserved in the ground to house the rail; and
the sealing device of claim 11 fixed in the housing by a fastening putty.

26. A railway comprising:
a housing extending between a side face of a rail and a side wall of a slot reserved in the ground to house the rail; and
the sealing device of claim 12 fixed in the housing by a fastening putty.

27. A railway comprising:
a housing extending between a side face of a rail and a side wall of a slot reserved in the ground to house the rail; and
the sealing device of claim 13 fixed in the housing by a fastening putty.

28. A railway comprising:
a housing extending between a side face of a rail and a side wall of a slot reserved in the ground to house the rail; and
the sealing device of claim 14 fixed in the housing by a fastening putty.

* * * * *